Aug. 6, 1957 C. R. FINE 2,802,061
PERSPECTIVE SOUND APPARATUS
Filed July 2, 1954
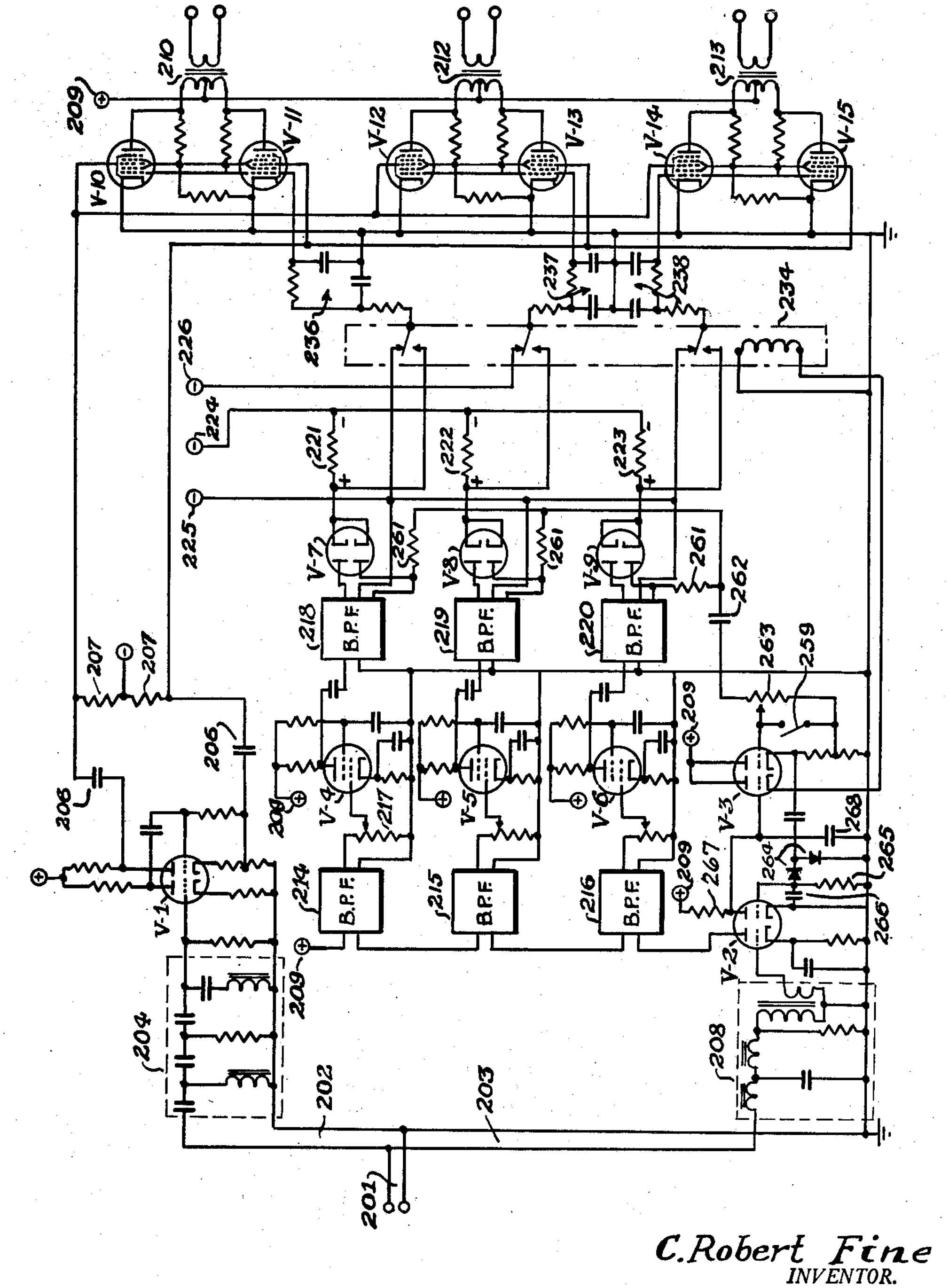
C. Robert Fine
INVENTOR.
BY Darby & Darby
ATT'YS United States Patent Office 2,802,061

Patented Aug. 6, 1957

2,802,061

PERSPECTIVE SOUND APPARATUS

Clarence Robert Fine, Tomkins Cove, N. Y., assignor to Perspecta Sound, Inc., New York, N. Y., a corporation of New York Application July 2, 1954, Serial No. 440,924

16 Claims. (Cl. 179—100.1)

The present invention concerns improvements in apparatus for producing stereophonic sound effects and is a continuation-in-part of my prior application, Ser. No. 384,897, for Perspective Sound Systems, filed October 8, 1953, now Pat. 2,714,633.

My prior application describes a number of systems for the production of stereophonic sound effects and apparatus therefor, especially useful with wide screen sound motion pictures. According to one of the systems disclosed in said prior application, a record is produced having a single sound track containing both audio signal components and a plurality of control signal components generally of lower frequency, each of the control signal components being a single-frequency tone and having an amplitude representative of the desired amplitude output from a respective one of a plurality of spaced sound reproducers, such as loudspeakers. The present invention is especially concerned with improvements in such records and circuits adapted to receive the composite signal recorded upon such records and to produce therefrom a plurality of output sound signals suitable for supplying to the respective loudspeakers either directly or through subsequent power amplifiers.

According to one important feature of the present invention improved "auto-switching" means are provided for automatically converting the system from a perspective or stereophonic-type sound system to a system utilizing so-called "flat" reproduction, upon failure of the control signals or the apparatus handling such control signals or upon reproduction of a record having no such control signals. This feature becomes of particular practical importance where the records are actually the sound tracks of motion picture films. As indicated in the above-identified parent application, the films containing sound tracks according to the present invention are completely compatible, in that such films can be exhibited in theaters with the special equipment such as that exemplified by the present invention to provide perspective sound effects, or the same film may be exhibited in theaters not so equipped, in which case, without any change in equipment, normal flat reproduction is obtained without any impairment whatever. By the same token, it is highly desirable that in theaters equipped with the special equipment of the present invention, upon substitution of an ordinary film for a film specially produced according to the invention, the apparatus must operate satisfactorily and preferably automatically to provide the desired results. This is accomplished by the present "auto-switching" circuit which assures that, in the absence of the control signals, the reproducing system is converted into a normal, simple, reproducing system of conventional type by eliminating the stereophonic sound effects entirely.

According to another feature of the present invention, special means are provided to prevent any harmful effects from possible interaction between control signals. It will be understood that the normal non-linearities present in electronic circuits and especially in electron tubes may provide an intermixing or intermodulation among signals.

When this happens, difference-frequency signals are produced, which can cause effects which are harmful and undesired. The present invention provides means for preventing such effects.

According to another aspect of the present invention, the circuit of the invention includes special means for avoiding other disturbing effects. For example, if action in a motion picture is momentarily confined to the center of the screen, the present system provides sound reproduction correspondingly at a center location. Should the apparent source of sound suddenly broaden out to cover the entire screen, as may be the case for background sound effects, normally this would mean that all left, center and right loudspeakers would become suddenly energized, instead of merely the center speaker which was previously energized. As a result, undesirable blasting may occur due to this tripling of the sound energy reproduced. According to a feature of the present invention, this is avoided by automatically causing the total energy to be distributed among the speakers at less than the former amplitude from a single speaker. The total energy may be kept constant, although this is not necessarily the case. In any event, the troubling blasting effect is avoided by reducing the energy level of each speaker when it is used in conjunction with others, as compared to its energy level when it is used alone.

The present invention also provides convenient and special circuits for easily attaining the desired control of the various speaker inputs in an accurate and simple manner.

A further feature of the present invention resides in providing a means for and method of overcoming the normal delays incident to control action in the circuit, so as to avoid lag of the control action behind the audio signal.

According to another feature of the invention, means are provided in connection with the "auto-switch" circuit for avoiding accidental and unintentional switching from perspective to flat sound reproduction or vice versa, such as may be caused by noise or similar pulses, or by short omission of control signals, as in splices.

The foregoing features of the present invention and their advantages and objects will become more fully apparent from consideration of the following detailed description of a preferred form of the invention, taken in conjunction with the appended single figure, which shows a schematic circuit diagram of one preferred form of the present invention.

The circuit of the present invention is intended to cooperate in conjunction with a record having recorded thereon a single track having both audio and control components. The audio components are electrical versions of the sound to be reproduced, as by speakers. The control components are separate tones or carriers, in number equal to the number of speakers or speaker groups to be used. Illustratively, it will be assumed that there are left, center and right speakers, so that three control carriers will be assumed. These carriers are adjusted in amplitude during the recording process so that each represents the desired output volume of its respective speaker. The frequencies of these carriers are preferably outside the range of normal reproduction, and to assure that these carriers will not interfere with reproduction by conventional apparatus, they are recorded with a level at least 18 db (and preferably of the order of 26–40 db) below the level of the audio components, to avoid both accidental audible reproduction of the control carriers, and also their intermodulation with the audio signal due to possible non-linearities in the system.

Referring to the figure, the input terminals are shown at 201 to which are supplied the composite signals having audio components and control components, derived from the record by suitable pickup means. For illustrative purposes, the present invention is described with respect to three separate control signal components, assumed to be of 30, 35 and 40 cycles per second. The amplitude of each control signal designates the desired amplitude output from a respective loudspeaker. This can be either a direct relationship in which a larger amplitude of a control signal provides an increase in the output from its respective speaker, or may be an inverse relationship in which an increase in control signal amplitude results in a decrease in output signal.

The signal supplied to input terminals 201 is divided into two channels 202 and 203, which are respectively the audio signal channel and the control signal channel.

In the audio signal channel the composite signal is supplied to a high-pass filter generally designated by 204, and having a sharp cut-off at a frequency above the control signals, but below the lower limit of desired sound reproduction, such as, for example, 63 cycles per second. The filter 204 therefore suppresses the control signals and passes only the audio components. This audio component signal is supplied to a double section tube V–1, whose first section serves as a conventional voltage preamplifier having resistance-capacitance coupling to the second section, which serves as a phase inverter to provide a balanced push-pull output. This audio output is then supplied over coupling condensers 206 and balanced coupling resistors 207 in push-pull to the three balanced control amplifier stages formed by the pairs of tubes V–10, V–11; V–12, V–13; V–14, V–15. Each of these control amplifier tubes is of the multi-grid type, such as type 6BE6, having two separate input grids. The audio signal derived from preamplifier and phase inverter V–1 is supplied to one of these input grids of each of the two tubes forming each control amplifier stage, in push-pull fashion. The three pairs of control amplifier tubes are supplied in parallel so far as the audio signals are concerned, and their outputs appear individually at their respective output transformers 210, 211, 212.

The control signal channel 203 supplies a low-pass filter indicated generally at 208 having a cut-off frequency in the neighborhood of 55 cycles per second, which permits only the control signals to pass and effectively cuts off the audio signals. By way of example, this filter may be 3 db down at 55 cycles and have a cut-off slope of 18 db per octave.

These control signals are then supplied to a voltage preamplifier of conventional type formed by the left section of tube V–2, whose anode is supplied from a source 209 through a series circuit formed by the respective bandpass filters 214, 215, 216. These filters 214, 215 and 216 are tuned respectively to 30, 35 and 40 cycles per second, and are designed to have a flat topped acceptance band with steep sides. The acceptance band is of the order of 2 cycles per second in width in order to permit a slight variation in frequency of the control signal carriers without driving them beyond the acceptance range of the filters. It will be understood that the control signals are normally reproduced from a sound motion picture, and their frequency will depend upon the speed of travel of the sound motion picture as it passes the pick-up head. Unavoidable changes in speed of the projector, such as caused by change in power frequency or amplitude, may vary the control frequencies by as much as 2%, and the bandpass filters 214, 215, 216 are made to accommodate this situation. A flat top for the bandpass filters is also required in order to avoid distortion of the sound level as reproduced.

As indicated above, the level of the control signals as recorded is substantially below that of the audio signals, by from 18 to 40 db. This low level of control signals must be made up by considerable amplification before such signals can be utilized. This is partially done by the voltage amplifier stage comprising the left section of tube V–2. Such amplification necessarily means that any slight deviation of control signals from proper value may be greatly magnified and may result in distorted output unless proper precautions are taken to correct this condition. This requires a flat top for the filters. For example, each filter may have a pass band whose attenuation varies less than ½ db for ±1 cycle from the rated center frequency, and having a steep cut off with attenuation of over 20 db at ±5 cycles from the center frequency. The particular constructions and circuits of these filters are immaterial to the present invention, and any conventional forms of filter may be used. Preferably, these filters are formed by tuned transformers providing direct current isolation between input and output.

Each of the filters 214, 215, 216 leads to a separate control channel for its respective 30, 35 or 40 cycle control carrier. These control channels are the same except for their respective operating frequencies, and accordingly the 30-cycle channel (which may control the left speaker for example) will be described as illustrative of all of them.

The bandpass filter 214 supplies its output to an amplifier V–4 whose input circuit contains a gain control 217, permitting initial or manual setting of the level of the control channel to a desired level to take into account any individual variations in the control channel circuit, its loudspeaker, its power amplifier, or in the acoustical conditions of the auditorium in which audio reproduction is being effected.

Capacitively coupled to the output of the voltage amplifier V–4 is a further bandpass filter 218 which may be identical to filter 214 or may be individually different to obtain in conjunction with filter 214 the desired overall flat top bandpass characteristic discussed above, in which case, the input filter section 214 may be tuned sharply to the desired center frequency while the output filter section 218 may have its primary and secondary tuned above and below the center frequency to provide the required band width. The output filter section 218 has a balanced output connection which is supplied to a full wave rectifier V–7 having a load resistance 221 connected to a source 224 of negative bias potential. By way of illustration, source 224 may have a value of —18.5 volts. The center tap of the output of filter 218 is connected directly to a source 225 of negative bias which may, for example, have a value of —20 volts. In this way, the control carriers as a group are separated out of the composite audio-plus-control signal by filter 208, and the individual carriers are separated out by the respective filters 214—218, 215—219 and 216—220. Each control carrier is then converted by its rectifier to a direct current bias appearing across load resistor 221, which control bias opposes the fixed bias of source 224 to provide proper operating bias for the second input grids of the control amplifiers. Skipping for the moment the function of relay 234, and considering again illustratively the left channel (the upper control channel in the figure), the control bias appearing at the cathodes of V–7 is connected through the upper contacts of relay 234 (when the relay is energized), to a double resistance-capacitor delay network 236 and thereby in parallel to the second control grids of both amplifier tubes V–10 and V–11. Tubes V–10 to V–15, inclusive, are variable gain remote cutoff tubes (such as type 6BE6) and to control bias derived from V–7 serves to suitably control the gain of the tubes V–10 and V–11 to the audio signal supplied to their first input grids from the phase inverter V–1. Accordingly, the output from amplifier V–10, V–11 appearing at its output transformer 210 has an amplitude determined by the control bias from V–7, and hence determined by the original amplitude of the 30-cycle control carrier. This output is used to energize the left speaker, either directly or through a power amplifier, to thereby produce desirably controlled output from the left speaker.

The center and right channels similarly control the center and right speakers in correspondence with the 35-cycle and 40-cycle carriers.

Accordingly, in the system just described, the 30-cycle control signal, for example, will pass through the bandpass filters 214 and 218 of the left channel to provide a correspondingly varying direct current bias across the load resistor 221, which correspondingly controls the audio output of the left-channel control amplifier V–10, V–11. The 35- and 40-cycle control signals produce corresponding voltages across load resistors 222 and 223 for controlling the respective center and right channel amplifiers V–12, V13 and V–14, V–15. In this way, the outputs of the respective left, center and right speakers are caused to have amplitudes corresponding to the amplitudes of the respective control carriers. During the production of the record or motion picture film sound track, these control carrier amplitudes are adjusted to have values which will produce the desired directional effects of the stereophonic type from three separated speakers and in this way the required perspective sound effects are produced with a single audio signal and single sound track.

It will be appreciated that any undesired variations in the amplitudes of the control carriers should be avoided in order to maintain the proper relationship and degree of control of the control amplifier outputs. For this reason, the bandpass filters should have as good flat-top characteristics as possible and the limit of ½ db down plus or minus one cycle from the center frequency has been determined to be the maximum tolerable as a practical matter. In addition, however, an undesired effect may be produced by intermodulation between the control tones themselves, which may be caused by insufficient attenuation of the bandpass filters or incidental cross-coupling in the power supplies or the like. This produces a wavering effect on the direct current bias appearing across the rectifier load resistors which, in the illustrative example given above, would waver at a 5-cycle rate producing an undesirable pulsation or "breathing" of the output audio signals.

According to one important feature of the present invention, this effect is obviated by providing a delay circuit such that the control amplifiers cannot respond to fluctuations of control potential occurring at as rapid a rate as 5 cycles per second. This means that fluctuations in the direct current bias occurring more sharply than at a rate corresponding to 5 cycles per second are eliminated and rendered ineffective to affect the control amplifiers. This not only avoids the 5-cycle effect, but also eliminates "bloops" or the like which may be caused by noise pulses, or scratches or dirt on the sound track in the case of optical recording.

Such a delay circuit is formed by the resistors and condensers shown at 236 in the upper or left channel. These resistors and condensers are selected to have a total time constant of at least one-quarter second and preferably are chosen to have a time constant of approximately one-half second, and thereby prevent the undesired 5-cycle fluctuation or noise-responsive fluctuation of the control amplifier output. Similar delay circuits 237 and 238 are provided for the other channels. Their time delays are at least as long as the reciprocal of the lowest frequency to be made ineffective.

These delay circuits also have the effect of delaying the control bias applied to the control amplifiers with respect to the audio signal. The delay interposed may be of the order of 600 milliseconds which is added to the delays produced by the filter sections 214 and 218, which may be of the order of 35 milliseconds. The effect of this delay is to retard the application of control to the audio signal. For example, a sudden change from left speaker to right speaker is thereby delayed by over ½ second, which may be quite noticeable.

To avoid such effects, according to another feature of the invention, a special process is followed in making the final record. A recording of the audio program alone is first made, and that program is thereafter reproduced while simultaneously the control carrier amplitudes are manually adjusted to provide proper directional shift of the apparent source of the reproduced sound. As the control carriers are varied, a recording is made of their amplitudes. Thereafter the two recordings, of the audio program and of the control carriers, are re-recorded upon a single record which is the final recording, such as the optical sound track of a motion picture. In this re-recording step, to correct the time delays just mentioned, the control carrier recording is advanced relative to the audio program recording by an amount which, at the established speed of playback, or pickup, corresponds to substantially the required time delay compensation. Thus, for a standard motion picture projection of 24 frames per second of 35 mm. film, the film moves 18 inches per second. For a time delay of about ⅔ second such as indicated above, the control carrier record is advanced about 12 to 16 frames (9 to 12 inches) relative to the corresponding audio program record during re-recording, and thereby overcomes this undesired delay.

The present invention also provides means for automatically overcoming another undesirable situation which could arise under special conditions of operation of the present system. For example, in some situations there may be an interval of time during which the center speaker alone is operative. This may correspond, for example, to a sequence in a motion picture in which all of the action, such as dialogue, is confined to the center location of the screen. This sequence may be followed by another sequence where the action is distributed across the entire screen, such as, for example, where background sound effects occur. In the production of the original master record or sound track, the original audio program recording has dialogue components and sound effects components (which sometimes may be combined with a musical background). In producing the final master record, these two audio signal components are mixed and are then supplied to the optical sound track recorder. The levels of these signals are appropriately adjusted for the desired recording level for each one and, for example, they may have the same level. These levels are thus fixed during this re-recording. When proceeding from the situation where the center speaker alone is effective, to one where all speakers are effective, where the signal level of the complete audio program does not change, normally the sound energy is substantially trebled, because three speakers become effective instead of the previous single speaker. This produces a sudden blasting which is undesirable. This is avoided in the present invention by providing deliberately poor regulation in the power supply 209 which supplies the plate potentials for the various tubes. By way of illustration, this plate supply may produce a voltage of from 275 to 300 volts at no load. This power supply is deliberately given internal impedance so that at full load the voltage will deliberately drop by at least 20 volts. This degree of regulation is designated herein as "poor regulation." The effect of such poor regulation is that, under the circumstances outlined above, as the three control amplifiers suddenly impress a demand for trebled energy on the power supply, the power supply voltage drops to prevent all that energy from being supplied to the control amplifiers. As a result, the three control amplifiers are then energized at lower levels than the previous level of the single center-channel amplifier, even without a change in audio signal or a change in control signal, and the result is gradual transition from single speaker operation to three-speaker operation. The effect of this poor regulation is to tend to maintain constant total energy from all three channels, for a given bias condition on the control amplifiers, and thereby to permit full freedom of directional sound effects without requiring compensating amplitude changes. In this way, during the recording process, the control carriers may be adjusted merely to vary the direction of the apparent sound source, without being concerned about whether one, two or three speakers are in operation and without requiring manual compensation for changes in number of speakers in operation.

This arrangement also has advantage in connection with the auto-switching circuit described hereinbelow, which, upon failure or absence of control carriers, automatically switches the system over to the center speaker alone, and, similarly, when the control carriers appear, automatically activates all three control amplifiers to energize all three speakers instead of just the one. By means of this poor regulation of the power supply, this shift between one and three loadspeakers in going between the flat and stereophonic reproduction conditions, results in little if any change in total energy sound level and avoids the necessity of an operator's readjustment of the reproduction level each time a reel or film section is played without control signals after one with such signals, or vice versa.

As indicated above, the present invention provides a fully compatible system in which films produced according to the invention may be reproduced either normally on a single speaker in theaters not equipped with the present apparatus or stereophonically by a plurality of speakers when so equipped. Likewise, standard films which do not have the required control carriers may be reproduced by use of the present equipment in the same manner as they would be reproduced by the conventional equipment, since by the auto-switching circuit now to be described the absence of control carriers automatically switches the system to a single (preferably central) loudspeaker.

It will be appreciated that at the output of each of the second section filters 218, 219 and 220 and just before the respective rectifiers V–7, V–8, V–9, there appears a signal of the carrier frequency and with an amplitude corresponding to the amplitude of the originally recorded control tone. A resistor 261 is coupled in each channel to the output of the second filter section, by connection to one anode of the rectifier, and these three resistors 261 are connected together and through a coupling condenser 262 to the input of a cathode follower amplifier stage formed by the right section of tube V–3. A variable control potentiometer 263 is provided in the input of this cathode follower amplifier stage V–3 right, to permit adjustment of the level at which auto-switching occurs. A switch 259 is provided for short-circuiting the input to the cathode follower amplifier stage V–3 right, for disabling the auto-switch circuit and thereby causing the system to operate continuously with flat sound reproduction, as on the center channel alone. The resultant low impedance output of this amplifier V–3 right is supplied to a voltage-doubler rectifier formed by a pair of rectifiers 264 having a load resistor 265 shunted by condenser 266, whereby there is produced across the resistor 265 a direct voltage corresponding to the sum of the amplitudes of the three control carriers. The voltage across resistor 265 is impressed on the input of a control tube formed by the right section of tube V–2, whose anode is coupled through a resistor 267 to plate supply source 209. A condenser 268 is coupled between this anode and ground. The voltage across condenser 268 is impressed on the input of a second control tube formed by the left section of tube V–3, having the winding of relay 234 in its cathode circuit.

The operation of this auto-switch circuit is as follows: During the continuous presence of the control carriers, a voltage appears across resistor 265 of a magnitude corresponding to the sum of the amplitudes of the control carriers, and is of a polarity and is adjusted by control 263 to be of a magnitude sufficient to cut off the first control tube section, V–2 right thereby raising the potential of its anode to correspondingly charge up condenser 268 and to render the control grid of the left section of V–3 highly positive, causing cathode current to flow therein to energize relay 234 and attract its three variable contacts downward.

When the three relay contacts are thus attracted downward, the control biases across the rectifier load resistors 221, 222, 223 are supplied to the respective control amplifiers to provide stereophonic operation.

It will be understood that so long as stereophonic operation is desired, there will be a signal supplied by the right section of V–3 to the rectifiers 264, since at least one of the control carriers is present during normal stereophonic operation. Potentiometer 263 provides an adjustable control for the bias across resistor 265 and sets the minimum control carrier level for which stereophonic operation may occur. Should all the control carriers disappear, as may be the case if a section of film not having any control carriers is spliced into a stereophonic film, then the voltage built up across resistor 265 will decay at a rate determined by the time constant of resistor 265 and condenser 266, correspondingly varying the bias on the right section of V–2. An instant is then reached at which the right section of V–2 reaches cut-off and begins to conduct, after a time delay determined by this time constant.

As V–2 right begins to conduct, its anode potential is depressed, and condenser 268 discharges through V–2 right, thereby reducing the potential on the grid of V–2 left. This action continues at a rate determined by the various time constants, until condenser 268 reaches a low enough voltage value to cut-off V–2 left, which thereby deenergizes relay 234. This in turn causes the movable relay contacts to move upward to their upper positions. In the upper position of top relay contact, it connects the fixed negative potential of source 225 to the grids of control amplifier tubes V–10 and V–11, which is sufficient to cut them off entirely. The same is true for the right channel control tubes V–14, V–15 which are cut off by the bias from source 225 applied through the bottom relay contacts in upper (deenergized) position. However, for the center channel, the middle contacts of relay 234 connect the grids of control amplifier tubes V–12, V–13 to the bias source 226. This source has a value permitting normal amplification by tubes V–12 and V–13.

Accordingly, when the control carriers diminish in total level below a value determined by potentiometer 263, relay 234 deenergizes to disable the left and right speakers and to apply fixed bias to the center channel amplifier, to permit normal operation by it independent of all control carrier amplitudes. Of course, any or all of the channels may be thus switched over to independent operation or be cut off, as may be desired.

In order to allow for momentary periods of silence on the screen, when control carrier levels may be very low or to allow for errors in splicing or the like, the time delay for deenergizing the relay 234 is made to have a value of approximately 1½ seconds. This time delay is of course made up of the time constant of resistor 265 and condenser 266, the time constant of condenser 268 and the internal resistance of V–2 right, and the relay drop-out time.

Upon reoccurrence of the control carriers, a resultant control carrier voltage appears at once in the output circuit of the right section of V–3 which is rectified by the rectifiers 264, providing a control voltage across resistor 265, and the right section of V–2 is cut off. Upon such cutting off, however, the potential of its anode does not immediately jump up to full plate potential, since current will continue to flow through the load resistor 267 until condenser 268 is charged up from its low residual value to the full value of source 209. The time constant of resistor 267 and condenser 268 is purposely made quite high, of the order of 20 seconds, so that a substantial period of time will pass before the potential on the grid of the left section V–3 rises to a value sufficient to permit cathode current to flow. This period may be of the order of 7 seconds in order to make sure that stray signals appearing in the system such as, for example, by dust on the sound track or noise passing the bandpass filters will not accidentally shift the system from flat to stereophonic sound. The time constant is made much longer than the actual delay period, so that substantially only the linear part of the condenser charging curve is used, yielding readily determinable cut-off conditions for V-3 left. In this way, the system requires the continual existence of control carriers for a period of, say 7 seconds, to automatically switch from flat to stereophonic sound.

To assure proper stereophonic reproduction, each separate reel or film section made according to the present invention is provided with a sound-track leader in advance of the initial frames, that leader having a sound track of substantially 168 frames (10½ feet) or more, with control carriers recorded thereon, so as to assure that the circuit is properly conditioned for stereophonic operation as soon as the first photographed frame of the film is projected.

Means are thus provided for automatically converting from flat to stereophonic sound, and conversely, depending solely upon the presence or absence of control carriers and without the intermediary of any operator. In addition, the poor regulation feature discussed above assures that there is no abrupt transition or change in sound energy upon the actuation of the relay 234, since when changing from one channel to three or from three to one, the regulation of the power supply tends to prevent large change in total sound energy.

It will be understood that, although described particularly above in connection with sound motion pictures, the present invention may equally well be used in any sound reproducing system where perspective or stereophonic effects are desired.

Certain aspects of the subject matter disclosed herein are disclosed and claimed in my co-pending application Serial No. 492,609 for Perspective Sound Systems, Apparatus and Methods, filed March 7, 1955, as a continuation-in-part of the present application.

It will be understood that the above description is illustrative only, and many equivalent circuits or portions of circuits may be substituted therein without departing from the spirit or scope of the invention.

What is claimed is:

1. A circuit responsive to a composite signal having an audio program component and a plurality of control signal components respectively representing desired intensities of audio program reproduction from a plurality of spaced points, said control signal components having separate frequencies outside the intended range of reproduction of said program component, said circuit comprising a single input channel for receiving said composite signal with both said program component signals and said control signal components, a pair of filters coupled to said input channel for separating said program signal component from all of said control signal components, a plurality of control amplifiers coupled to one of said filters and each adapted to be supplied with said separated program signal component, a plurality of filters coupled to the other of said first filters for segregating said control signal components one from another, a respective rectifier coupled to the output of each of said latter filters for producing a direct current signal representative of the amplitude of its respective control signal, and means for controlling the gain of each of said amplifiers by a respective one of said direct current signals, whereby the program signal output from each said amplifier has an amplitude corresponding to one of said control signal components.

2. A circuit responsive to a composite signal with both an audio program component and a plurality of control signal components respectively representing desired intensities of reproduction of said audio program at a plurality of spaced points, said circuit comprising a single input channel for receiving said composite signal with both said program and control signal components, means coupled to said channel for separating said program and control signal components, a plurality of control amplifiers each coupled to said separating means to be supplied with said separated program component, and means also coupled to said separating means for controlling the gain of each of said amplifiers by a respective one of said control signal components, whereby the program signal output from each said amplifier has an amplitude corresponding to a respective one of said control signal components.

3. A circuit responsive to an audio program signal and a plurality of control signals representing desired intensities of reproduction of said audio program at a plurality of spaced points, said circuit comprising a plurality of control amplifiers each adapted to be supplied with said audio program signal, means controlling the gain of each of said amplifiers by a respective one of said control signals, whereby the program signal output from each said amplifier has an amplitude corresponding to one of said control signals, and means responsive to a predetermined condition of said control signals for causing at least one of said amplifiers to have constant gain and for cutting off the remainder of said amplifiers.

4. A circuit as in claim 3, wherein each of said amplifiers has a gain-controlling electrode, and said gain-controlling means comprises means for deriving respective biases representative of the amplitude of said control signals, and for supplying each such bias to a respective gain-controlling electrode.

5. A circuit responsive to an audio program signal and a plurality of control signals representing desired intensities of reproduction of said audio program at a plurality of spaced points, comprising a plurality of control amplifiers, each adapted to be supplied with said audio program signal, means controlling the gain of each of said amplifiers by a respective one of said control signals, whereby the program signal output from each said amplifier has an amplitude corresponding to one of said control signals, each of said amplifiers having a gain-controlling electrode and said gain-controlling means comprising means for deriving respective biases representative of the amplitudes of said control signals and for supplying each such bias to a respective gain-controlling electrode, means responsive to a predetermined condition of said control signals for causing at least one of said amplifiers to have constant gain and for cutting-off the remainder of said amplifiers, said last-named means comprising a first source of fixed cut-off bias and a second source of fixed-gain bias, and means responsive to a reduction in the sum of the amplitudes of said control signals below a predetermined level for substituting said second fixed-gain bias for said control-signal-representative bias on at least one of said amplifiers and substituting said first cut-off bias for said control-signal-representative bias on the remainder of said amplifiers.

6. A circuit as in claim 5 wherein said relay means comprises means for deriving a combined signal having components representative of all said control signals, means for rectifying said combined signal, a first control tube, means for cutting off said first control tube in response to values of said rectified signal in excess of a predetermined value, a second control tube, a relay in the output circuit of said second tube, a condenser connected across the input of said second tube and directly connected to the output of said first tube, whereby said relay is energized in response to said excess-value rectified signal.

7. A circuit as in claim 6 further including time delay means for delaying deenergization of said relay in response to reduction of said rectified signal below said predetermined value, and further time delay means for delaying energization of said relay in response to increase of said rectified signal above said predetermined value.

8. A circuit as in claim 3 wherein said last means comprises means responsive to a reduction in the sum of said control signal amplitudes below a predetermined level for causing said constant gain and said cutting off.

9. A circuit as in claim 8 further including time delay means for delaying rendering said amplifiers independent of said control signals by a predetermined time interval, and further including means responsive to departure from said predetermined condition for another predetermined time interval for replacing said latter amplifiers under the control of said control signals.

10. In a sound reproducing system adapted selectively to reproduce sound by a plurality of sound reproducers or by a lesser number of such reproducers, in combination, a plurality of vacuum tube amplifiers each adapted to amplify the signal for a respective one of said reproducers, means for selectively energizing all or fewer than all said reproducers, comprising means for selectively controlling the biasing of the tubes of said amplifiers, and a common power supply for said amplifier tubes, said power supply having internal impedance sufficient to cause substantial drop in output when changing from energization of fewer than all to energization of all said reproducers whereby sharp changes in total sound energy from said reproducers are avoided.

11. In a sound reproducing system adapted selectively to reproduce sound by a plurality of sound reproducers or by a lesser number of such reproducers, in combination, a plurality of amplifier tubes for respectively energizing said reproducers, a bias control circuit for each of said amplifier tubes for determining whether each such tube is in cut-off or amplifying condition, whereby the respective reproducers are selectively cut-off or energized, and a common power supply for said tubes, said supply having internal impedance sufficient to cause substantial drop in output when changing from energization of fewer than all to energization of all said reproducers, whereby sharp changes in total sound energy from said reproducers are avoided.

12. In a circuit for supplying a single intelligence signal to a plurality of circuits with individual amplitudes corresponding respectively to the amplitudes of respective control signals of different frequency, in combination, a plurality of variable-gain control amplifiers each having its output coupled to a respective one of said circuits and having its input supplied by said intelligence signal, a plurality of control channels each adapted to be energized by a respective one of said control signals, each said channel including means for producing a control bias representative of the amplitude of its control signal, means coupling each of said channels to a respective amplifier to supply its bias thereto to determine the gain thereof, and comprising a time delay circuit for preventing interaction between said channels, said time delay circuit having a time constant at least as large as the inverse of the smallest frequency difference between control signals.

13. In a circuit for supplying a single intelligence signal to a plurality of circuits with individual amplitudes corresponding respectively to the amplitudes of respective control signals of different frequency, in combination, a plurality of variable-gain control amplifiers each having its output coupled to a respective one of said circuits and having its input supplied by said intelligence signal, a plurality of control channels having a common input, each channel including means for passing one of said control signals and substantially rejecting all others, each said channel including means for producing a control bias representative of the amplitude of the control signal passed by it, means coupling each of said channels to a respective amplifier to supply its bias thereto to determine the gain thereof, and comprising a time delay circuit for preventing interaction between said channels, said time delay circuit comprising a resistance-capacitance network having a time constant at least as large as the inverse of the smallest difference between said control signal frequencies.

14. In a circuit for supplying a single intelligence signal to a plurality of circuits with individual amplitudes corresponding respectively to the amplitudes of respective control signals of different frequency, in combination, a plurality of variable-gain control amplifiers each having its output coupled to a respective one of said circuits and having its input supplied by said intelligence signal, each of said amplifiers including a gain-controlling electrode, a plurality of control channels having a common input, each channel including means for passing one of said control signals and substantially rejecting all others, each said channel including means for producing a control bias representative of the amplitude of the control signal passed by it, means supplying each such bias to its respective amplifier gain-controlling electrode, said supplying means including a series-resistor shunt-capacitor time delay circuit with a time constant at least as large as the inverse of the smallest frequency difference between said control signals.

15. A circuit responsive to an audio program signal and a plurality of control signals respectively representative of desired intensities of reproduction of said audio program at a plurality of spaced points, comprising a plurality of control amplifiers, each adapted to be supplied with said audio program signal, means for controlling the gain of each of said amplifiers by a respective one of said control signals, whereby the program signal output from each said amplifier will have an amplitude corresponding to a respective one of said control signal, said gain-controlling means comprising means for deriving respective biases each representative of the amplitude of one of said control signals and for controlling the gain of each of said amplifiers by a respective bias, and means responsive to a predetermined condition of said control signals for causing at least one of said program signal outputs to be rendered independent of said control signals, said last means comprising means responsive to said condition for substituting a cut-off bias for the control-signal-representative bias of at least one of said amplifiers and for substituting a fixed-gain bias for each of said control-signal-representative biases of the remainder of said amplifiers.

16. A circuit as in claim 15 wherein said substituting means comprises means for combining said control-signal-representative biases into a composite bias, a relay means for effecting said bias substitutions, and delay means interposed between said combining means and said relay means for causing operation of said relay means only after said predetermined control signal condition has continued for a predetermined time interval.

References Cited in the file of this patent

UNITED STATES PATENTS

| | | |
|---|---|---|
| 2,238,733 | Hullegard | Apr. 15, 1941 |
| 2,260,699 | Blaney | Oct. 28, 1941 |
| 2,298,618 | Garity et al. | Oct. 13, 1942 |
| 2,313,851 | Van Deventer | Mar. 16, 1943 |
| 2,313,867 | Garity et al. | Mar. 16, 1943 |
| 2,314,382 | Batsel | Mar. 23, 1943 |
| 2,361,490 | Mueller | Oct. 31, 1944 |
| 2,484,881 | Fuschi | Oct. 18, 1949 |
| 2,616,970 | Broos | Nov. 4, 1952 |
| 2,636,943 | Schaeffer | Apr. 28, 1953 |